W. T. HOLLIS.
MACHINE FOR MEASURING SURFACE AREAS.
APPLICATION FILED SEPT. 23, 1909.

1,016,012.

Patented Jan. 30, 1912.

2 SHEETS—SHEET 1.

Witnesses.
C. H. Gannett
J. Murphy

Inventor.
Warren T. Hollis
By Jas. H. Churchill
Atty.

W. T. HOLLIS.
MACHINE FOR MEASURING SURFACE AREAS.
APPLICATION FILED SEPT. 23, 1909.

1,016,012.

Patented Jan. 30, 1912.

2 SHEETS—SHEET 2.

UNITED STATES PATENT OFFICE.

WARREN T. HOLLIS, OF BOSTON, MASSACHUSETTS.

MACHINE FOR MEASURING SURFACE AREAS.

1,016,012. Specification of Letters Patent. Patented Jan. 30, 1912.

Application filed September 23, 1909. Serial No. 519,166.

*To all whom it may concern:*

Be it known that I, WARREN T. HOLLIS, a citizen of the United States, residing in Boston, county of Suffolk, and State of Massachusetts, have invented an Improvement in Machines for Measuring Surface Areas, of which the following description, in connection with the accompanying drawings, is a specification, like letters on the drawings representing like parts.

This invention relates to a machine for measuring surface areas, such as the surface areas of hides, skins and leather, and has for its objects to provide a novel and efficient machine for this purpose, in which provision is made for obtaining a substantially continuous contact of a plurality of measuring wheels having provision for movement by the hide, skin or leather independently of one another. To this end, the measuring wheels, which may be of substantially the same diameter as those now commonly used in the well-known Sawyer machine, are provided on their outer circumference with gear teeth, which are adapted to mesh with and drive toothed segments or wheels operatively connected with the indicating mechanism of the machine. Each measuring wheel is mounted to rotate on a bearing hub or disk, which is capable of bodily movement with relation to the shaft supporting the same, as will be described.

Figure 1:
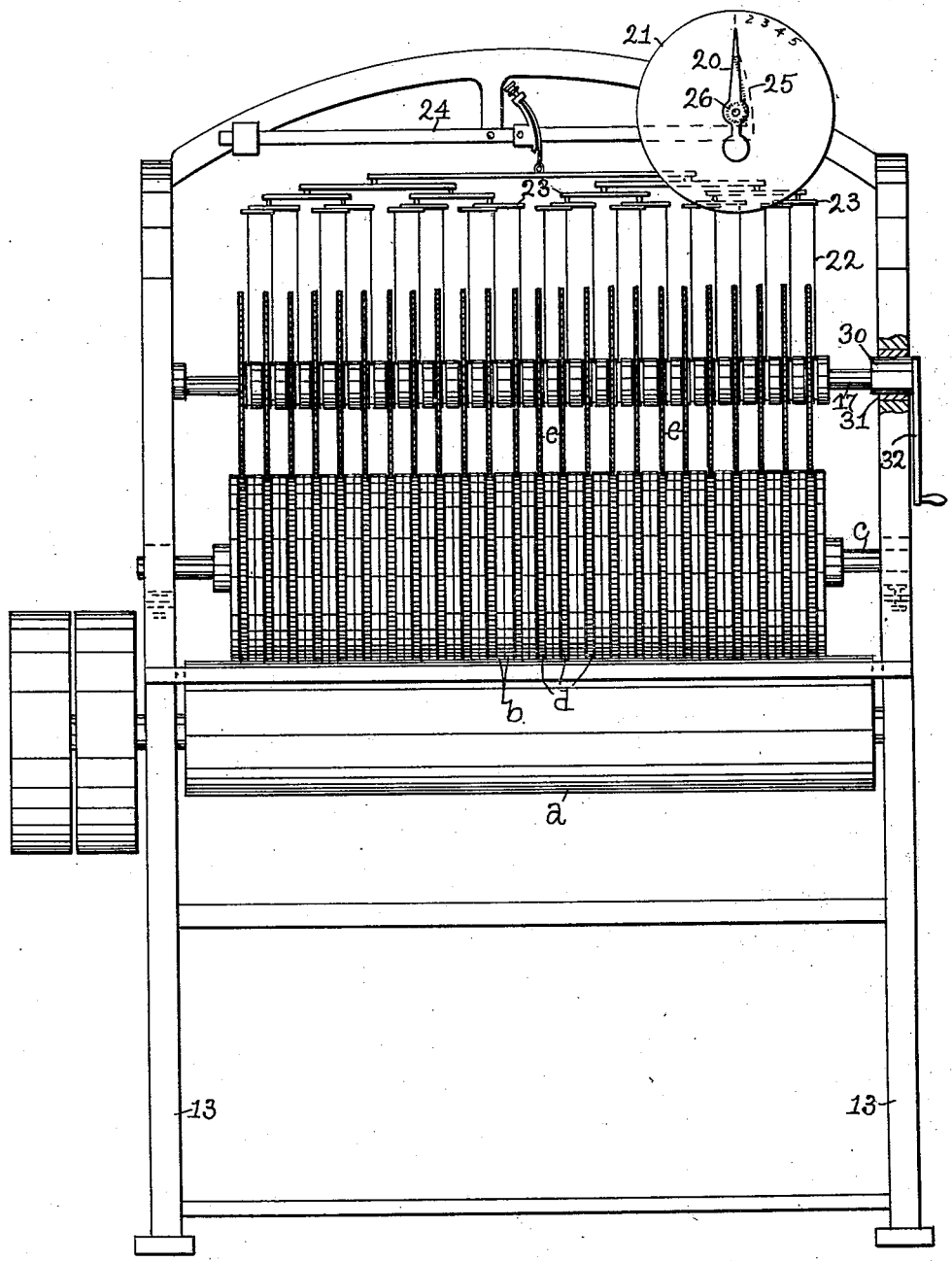
Figure 3:
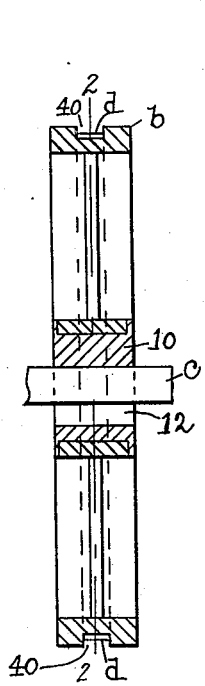
Figure 2:
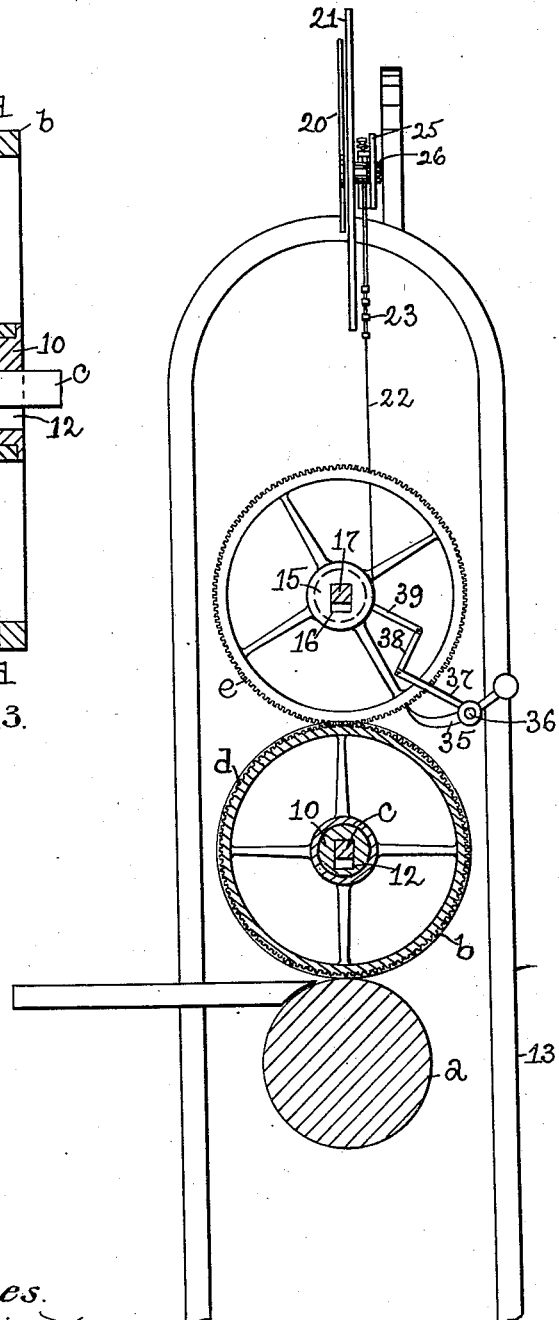

Figure 1 is a front elevation of a measuring machine embodying this invention. Fig. 2, an enlarged detail in vertical section of a portion of the machine shown in Fig. 1, and Fig. 3, a detail in section of one of the measuring wheels.

Referring to the drawing, $a$ represents a bed roll with which coöperate a plurality of measuring wheels $b$, mounted in a manner as will be described on a shaft $c$ in close proximity to one another so as to form a practically continuous measuring surface extended longitudinally of the bed roll. Each measuring wheel $b$ is provided on its outer circumference with gear teeth $d$, which extend around the wheel and engage toothed devices, which may be complete wheels $e$ as herein shown or segment of wheels as commonly used in measuring wheels of the well-known Sawyer type.

Each measuring wheel $b$ is mounted to turn on a disk or hub 10 having an elongated, rectangular slot 12 through which the shaft $c$ is extended, that portion of the shaft between the side frames 13 of the framework of the machine and which is engaged by the bearing disks or hubs 10 being square in cross-section and of substantially the width of the slot 12. The slots 12 are made of greater length than the squared portion of the shaft $c$, so that the said bearing disks and wheels may be moved bodily with relation to the shaft to respond to the different thicknesses of the leather. The toothed wheels $e$ are provided with similar bearing disks 15 having elongated slots 16, through which extend the squared portion of a shaft 17 supported by the side frames of the machine. The toothed devices or wheels $e$ are connected with the pointer 20 coöperating with the registering dial 21 by cords or flexible connections 22, levers 23, main lever 24, toothed rack 25 and pinion 26 in a manner well understood and such as now commonly employed in machines of this class.

The shaft $c$ for the measuring wheels $b$ may be supported in the side frames 13 in any suitable manner, and the shaft 17 for the toothed wheels $e$ are provided at their ends with eccentric hubs or journals 30, which are mounted to turn in bearings 31, one of said journals being provided as shown with a crank or handle 32, by turning which the eccentrics 30 may be turned so as to raise the shaft 17 and lift the toothed wheels $e$ out of engagement with the teeth $d$ of the measuring wheels $b$, so as to enable the toothed devices to be rotated in a reverse direction in order to restore the pointer to zero. The toothed devices $e$ are held in the positions into which they are moved by the measuring wheels by holding pawls 35, which are fast on a rock-shaft 36 having a crank 37, which is joined by a link 38 to a crank 39 on the shaft 17, so that when the handle 32 is turned to lift the toothed wheels out of engagement with the teeth of the measuring wheels, the rock-shaft 36 will be turned so as to disengage the holding pawls 35 from the toothed wheels $e$, and when the said handle is turned in the opposite direction to again engage the toothed devices $e$ with the toothed measuring wheels, the holding pawls will be again engaged with the said toothed devices.

The annular teeth $d$ on the outer circumference of the measuring wheel are preferably formed in an annular groove 40 therein, so that the teeth $d$ will not contact with the leather and will leave the measuring wheel with a smooth contacting surface. Furthermore the teeth may be made substantially small and of the same or substantially the same length as the teeth of the devices or wheels e, although in the drawing the teeth d are shown slightly longer for sake of clearly illustrating the construction.

In operation, the measuring wheels are rotated on their bearing hubs or disks 10 by the leather, which is fed through the machine, and as the leather is interposed between said wheels and the bed roll a, the wheels and their bearing disks or hubs 10 are bodily moved upward, which is permitted by the elongated slots 12 in said hubs, and as the measuring wheels are bodily moved, they carry with them their coöperating toothed wheels e and their bearing disks or hubs 15, which is permitted by the elongated slots 16.

By reference to Fig. 1, it will be seen that the measuring wheels may be set in such close proximity as to form a practically continuous contacting surface for engagement with the leather, thereby avoiding the errors due to the separation of the measuring wheels from one another. It will also be observed, that the toothed devices e are at all times in engagement with the teeth d of the measuring wheels b, and as a result, liability of error arising from the disengagement of the devices e with pinions attached to the hub of the measuring wheels as in the well-known Sawyer machine is avoided.

Claims:

1. In a machine of the character described, in combination, a plurality of measuring wheels rotatable and bodily movable by contact with the object whose surface is being measured and provided on their external circumferences with teeth, toothed devices engaging the external circumferential teeth of said measuring wheels and bodily movable in the same direction with the measuring wheels and rotatable thereby, an indicating device, and means for connecting said indicating device with said toothed devices, substantially as described.

2. In a machine of the character described, in combination, a plurality of measuring wheels rotatable and bodily movable by contact with the object whose surface is being measured and provided with circumferential teeth, bearing hubs or disks provided with slots and upon which said wheels are mounted to turn, a shaft extended through said slots, toothed devices engaging the circumferential teeth of said measuring wheels, bearing hubs or disks provided with slots and upon which said toothed devices are mounted to turn, a shaft extending through the slots in the bearing disks or hubs of the said toothed devices, an indicating device, and means for connecting said indicating device with said toothed devices, substantially as described.

3. In a machine of the character described, in combination, a plurality of measuring wheels rotatable and bodily movable by contact with the object whose surface is being measured and provided with circumferential teeth, bearing disks or hubs upon which said measuring wheels are mounted to turn thereon and to move bodily therewith, a shaft upon which said bearing disks or hubs are supported and bodily movable with relation thereto, toothed devices engaging said circumferential teeth, an indicating device, and means for connecting said toothed devices with said indicating device, substantially as described.

4. In a machine of the character described, in combination, a plurality of rotatable measuring wheels, bearing hubs or disks upon which said wheels turn and are bodily movable therewith, said hubs or disks having elongated slots, a shaft extended through said slots, an indicating device, and means for operatively connecting said indicating device with said measuring wheels, substantially as described.

5. In a machine of the character described, in combination, a plurality of rotatable measuring wheels, bearing hubs or disks upon which said wheels turn and are bodily movable therewith, a shaft extended through openings in said hubs or disks larger than said shaft, an indicating device, and means for operatively connecting said indicating device with said measuring wheels, substantially as described.

In testimony whereof, I have signed my name to this specification in the presence of two subscribing witnesses.

WARREN T. HOLLIS.

Witnesses:
JAS. H. CHURCHILL,
J. MURPHY.

---

Copies of this patent may be obtained for five cents each, by addressing the "Commissioner of Patents, Washington, D. C."